United States Patent
Xu et al.

(10) Patent No.: US 11,044,324 B2
(45) Date of Patent: Jun. 22, 2021

(54) METHOD AND DEVICE FOR MAINTAINING SESSION OF NETWORK STORAGE DEVICE

(71) Applicant: EMC IP Holding Company LLC, Hopkinton, MA (US)

(72) Inventors: Sherry Hongru Xu, Shanghai (CN); Grace Hui Xu, Shanghai (CN); Vincent Zexian Liao, Shanghai (CN); Alvan Fei Long, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 185 days.

(21) Appl. No.: 15/954,982

(22) Filed: Apr. 17, 2018

(65) Prior Publication Data

US 2018/0302480 A1  Oct. 18, 2018

(30) Foreign Application Priority Data

Apr. 17, 2017 (CN) .......................... 201710248162.0

(51) Int. Cl.
*H04L 29/08* (2006.01)
*G06F 9/455* (2018.01)

(52) U.S. Cl.
CPC ........ *H04L 67/148* (2013.01); *G06F 9/45558* (2013.01); *H04L 67/1004* (2013.01); *H04L 67/1027* (2013.01); *H04L 67/1097* (2013.01); *H04L 67/145* (2013.01); *G06F 2009/4557* (2013.01); *G06F 2009/45579* (2013.01)

(58) Field of Classification Search
CPC .............. H04L 67/148; H04L 67/1004; H04L 67/1027; H04L 67/1097; H04L 67/145; G06F 9/45558; G06F 2009/4557; G06F 2009/45579
See application file for complete search history.

(56) References Cited

U.S. PATENT DOCUMENTS

| | | | |
|---|---|---|---|
| 7,124,171 B1 | 10/2006 | McCann | |
| 9,459,804 B1 | 10/2016 | Natanzon et al. | |
| 9,519,656 B2 | 12/2016 | Yin et al. | |
| 9,811,431 B1 | 11/2017 | Natanzon et al. | |
| 9,910,739 B1 | 3/2018 | Natanzon et al. | |
| 9,940,059 B2 | 4/2018 | Agrawal et al. | |
| 10,228,959 B1* | 3/2019 | Anderson | G06F 9/45558 |
| 2008/0002663 A1* | 1/2008 | Tripathi | H04L 45/586 370/351 |
| 2008/0163239 A1* | 7/2008 | Sugumar | G06F 9/5088 718/105 |
| 2014/0317438 A1* | 10/2014 | Ripoll | G06F 11/2035 714/4.11 |
| 2018/0241610 A1* | 8/2018 | Wang | H04L 12/4633 |

* cited by examiner

*Primary Examiner* — Abdulkader M Alriyashi
(74) *Attorney, Agent, or Firm* — BainwoodHuang (57) ABSTRACT

The present disclosure involves a method and device for maintaining a session of a network storage device. As an example, there is provided a method of maintaining a session of a network storage device, comprising: storing a profile of the session in a network storage device, the profile describing attributes of the session; migrating a first virtual server associated with the session and managed by a first storage processor in the network storage device to be managed by a second storage processor, the migration causing the session to be disconnected; recovering the session using attributes based on the stored profile; and updating signature of the session. Thus, when migration occurs in a virtual server, the associated session can be maintained.

17 Claims, 11 Drawing Sheets

METHOD AND DEVICE FOR MAINTAINING SESSION OF NETWORK STORAGE DEVICE

RELATED APPLICATIONS

This application claim priority from Chinese Patent Application Number CN201710248162.0, filed on Apr. 17, 2017 at the State Intellectual Property Office, China, titled "METHOD AND DEVICE FOR PRESERVING SESSION FOR NETWORK STORAGE DEVICE" the contents of which is herein incorporated by reference in its entirety.

FIELD

Embodiments of the present disclosure generally relate to a network storage device, and more specifically, to a method and device for maintaining a session of a network storage device.

BACKGROUND

Load balancing is a technique that can be applied in a network storage device with the aim of migrating (moving) a virtual server from being managed by a storage processor under heavy workload in the network storage device to being managed by an idle storage processor so as to optimize utilization rate of more than two storage processors in the network storage device. There might be a replication session in the virtual server being used in the network storage device for replicating (backing up) data periodically, and the session is closely related to the corresponding virtual server. Thus, after migrating the virtual server, the replication environment changes and the replication session created before the migration will be unusable. However, at present, an effective scheme for maintaining a migrated replication session has still not been proposed in the art. Besides, owing to complexity of network storage technology and diversity of user demand, there is still in need of a scheme for maintaining a migrated replication session for different scenarios in the art.

SUMMARY

Embodiments of the present disclosure provide a method, a device and a corresponding computer program product for maintaining a session of a network storage device.

In a first aspect of the present disclosure, there is provided a method of maintaining a session of a network storage device. The method comprises: storing a profile of the session in a network storage device, the profile describing attributes of the session; migrating a first virtual server associated with the session and managed by a first storage processor in the network storage device to be managed by a second storage processor, the migration causing the session to be disconnected; recovering the session using the attributes based on the stored profile; and updating signature of the session.

In some embodiments, data in a network storage device are replicated into further network storage device via the session before the session is disconnected. Updating signature of the session may comprise: updating identity information associated with the network storage device in the session to be identity information of the second storage processor; and updating address information associated with the first storage processor in the session to be address of the second storage processor.

In some embodiments, data in further network storage device are replicated into the network storage device via the session before the session is disconnected. Updating the signature of the session may comprise: updating identity information associated with the network storage device in the session to be identity information of the second storage processor; and updating address information associated with the first storage processor in the session to be address of the second storage processor.

In some embodiments, data in the first virtual server managed by the first storage processor are replicated into a second virtual server managed by the second storage processor via the session before the session is disconnected. Updating the signature of the session may comprise: updating identify information associated with the first storage processor in the session to be identify information of the second storage processor; and updating address information associated with the first storage processor in the session to be address of the second storage processor.

In some embodiments, data in the first virtual server managed by the first storage processor are replicated into the second virtual server managed by the first storage processor via the session before the session is disconnected. Updating the signature of the session may comprise: updating identify information associated with the first virtual server in the session to be identity information of the second storage processor; and updating address information associated with the first virtual server in the session to be address of the second storage processor.

In a second aspect of the present disclosure, there is provided an electronic device, which comprising at least one processing unit and at least one memory. The at least one memory is coupled to the at least one processing unit and stores machine-executable instructions, the instructions, when executed by the at least one processing unit, causing the electronic device to perform acts of: storing a profile of a session for a network storage device in the network storage device, the profile describing attributes of the session; migrating a first virtual server associated with the session and managed by the first storage processor in the network storage device to be managed by a second storage processor, the migration causing the session to be disconnected; recovering the session using the attributes based on the stored profile; and updating signature of the session.

In a third aspect of the present disclosure, there is provided a computer program product being tangibly stored on a non-transient computer-readable medium and comprising machine-executable instructions which, when executed, causing the machine to perform any steps of the method described according to the first aspect of the present disclosure.

This Summary is provided to introduce a selection of concepts that are further described below in the Detailed Description in a simplified form. This Summary is not intended to identify key features or essential features of the claimed subject matter, nor is it intended to be used to limit the scope of the claimed subject matter.

BRIEF DESCRIPTION OF THE DRAWINGS

Through the following detailed description with reference to the accompanying drawings, the above and other objectives, features, and advantages of the present disclosure will become more apparent, where in the example embodiments of the present disclosure, the same reference symbols refer to the same elements.

DETAILED DESCRIPTION OF EMBODIMENTS

Preferred embodiments of the present disclosure will be described in greater detail with reference to the drawings. Although the drawings present the preferred embodiments of the present disclosure, it should be understood that the present disclosure can be implemented in various ways and should not be limited by the embodiments disclosed herein. Rather, those embodiments are provided for thorough and complete understanding of the present disclosure, and completely conveying the scope of the present disclosure to those skilled in the art.

The term "comprise" and its variations used in the present disclosure mean comprising in an open-ended sense, i.e. "include without limitation". Unless otherwise specified, the term "or" means "and/or". The term "based on" means "at least partially based on". The terms "one exemplary embodiment" and "one embodiment" represent "at least one embodiment"; the term "another embodiment" represents "at least one another embodiment". The terms "first", "second" and the like may refer to different or the same objects. Other explicit and implicit definitions might further be included in the following description.

Figure 1A:
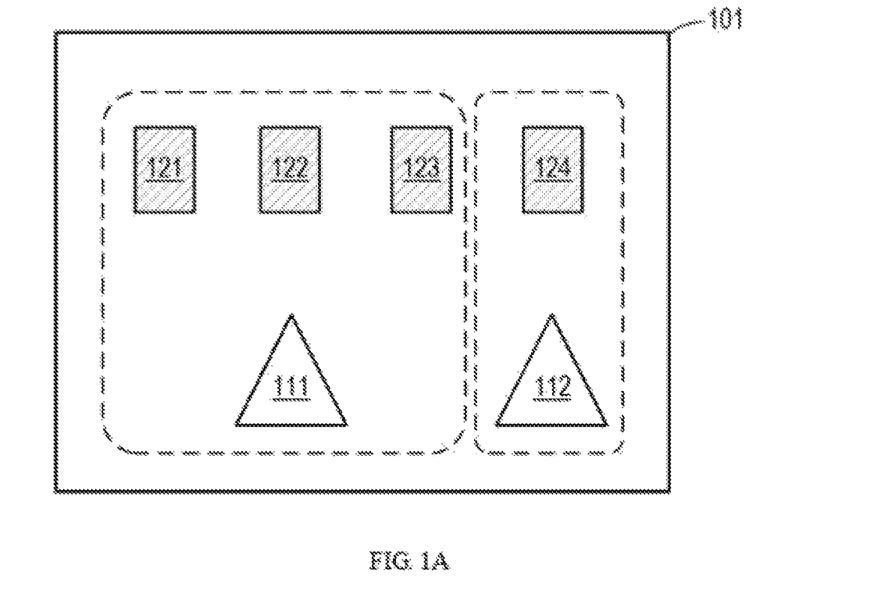
FIG. 1A illustrates a schematic diagram of a network storage device comprising two storage processors according to the prior art.

FIG. 1A is a schematic diagram illustrating a network storage device 101 comprising two storage processors 111, 112 according to the prior art. As shown in FIG. 1, the network storage device 101 comprises a plurality of virtual servers, such as virtual servers 121 to 124. A virtual server is a storage in the network storage device divided for storing user files. The network storage device 101 may comprise more than two storage processors. FIG. 1A only illustrates a case of two storage processors. As is shown by the dashed boxes, the first storage processor 111 is configured to, for instance, manage virtual servers 121 to 123, and the second storage processor 112 is configured to manage the virtual server 124. Besides, the network storage device 101 shown in FIG. 1A may be a UNITY storage product produced by EMC Corporation or other network storage devices. The virtual server may be a network attached storage server (NAS server), or other virtual servers or virtual data movers configured in the network storage device.

Generally, a network storage device, such as UNITY storage product produced by EMC, can be divided into as many as 100 (or more) virtual servers. Therefore, there is a case that the number of virtual servers managed by the storage processor in the network storage device is much larger than that of virtual servers managed by another storage processor. As an example, the number of virtual servers managed by the first storage processor 111 in the network storage device 101 is much greater than that of virtual servers managed by the second storage processor 112. For the sake of clear illustration, FIG. 1A only depicts a case where the first storage processor 111 manages three virtual servers 121 to 123, and the second storage processor 112 manages a virtual server 124. To achieve load-balancing, the network storage device 101 may migrate one of the three virtual servers 121 to 123 (such as virtual server 123) from being managed by the first storage processor 111 in the network storage device 101 to being managed by the second storage processor 112.

Figure 1B:
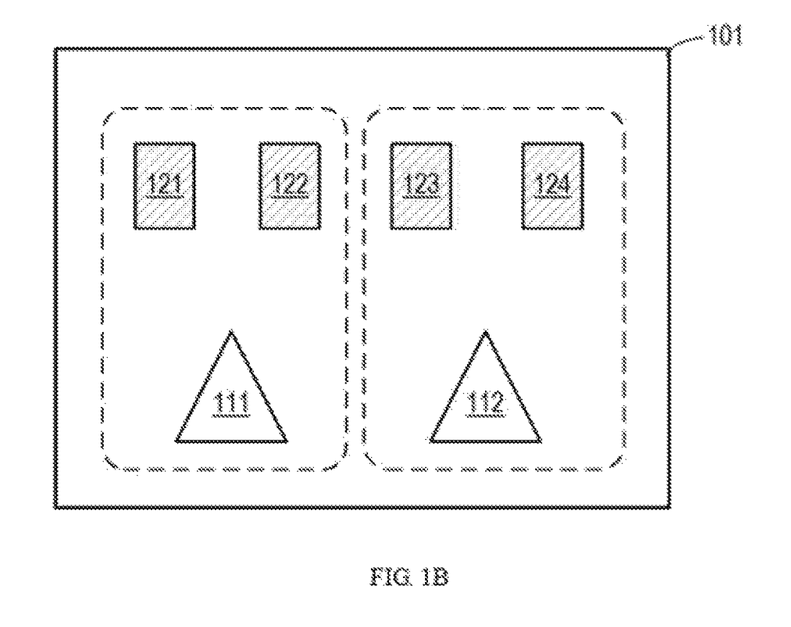
FIG. 1B illustrates a schematic diagram for performing load-balancing to the two storage processors shown in FIG. 1A according to the prior art.

FIG. 1B is a schematic diagram for performing load-balancing to the two storage processors 111, 112 shown in FIG. 1A according to the prior art. As illustrated by dashed boxes in FIG. 1B, after migration is completed, the first storage processor 111 is configured to manage virtual servers 121 and 122, and the second storage processor 112 is configured to manage virtual servers 123 and 124. In other words, the virtual server 123 has been migrated to being managed by the second storage processor 112. The migrated virtual server 123 might have a replication session (not shown in FIG. 1A and FIG. 1B, reference can be made to session S in FIGS. 3 and 4, 5A-B and 6A-B) for replicating (backing up) data with other virtual servers, and the session is associated with migration of the virtual server 123. Thus, after the virtual server 123 is migrated, the replication environment changes, and replication session created before the migration will be unusable. However, at present, no techniques to maintain this session have been proposed in the art. Therefore, a scheme for maintaining the session associated with the migrated virtual server (such as virtual server 123) is in need.

Figure 2:
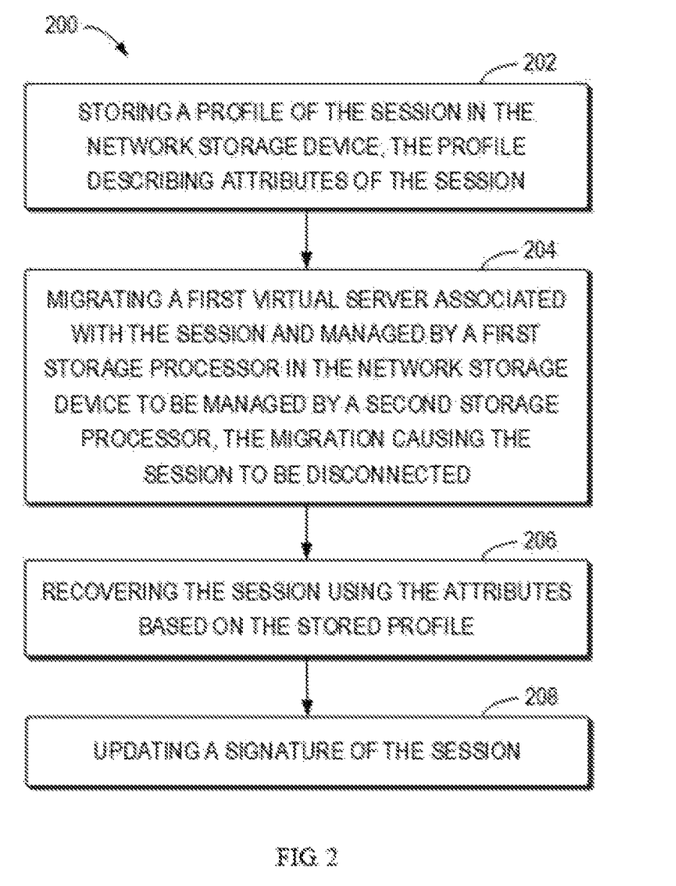
FIG. 2 illustrates a flowchart of a process or method for maintaining a session of a network storage device according to the embodiments of the present disclosure.

To solve the above and other potential problems and defects at least in part, embodiments of the present disclosure provide a scheme for maintaining a session of a network storage device. FIG. 2 is a flowchart illustrating a process or method 200 for maintaining the session of the network storage device according to the embodiments of the present disclosure. In some embodiments, method 200 may be implemented in the device shown in FIG. 7. The process or method 200 for data protection storage according to the embodiments of the present disclosure shown in FIG. 2 will be illustrated referring to FIGS. 1A and 1B.

At 202, a profile of the session is stored in the network storage device 101, the profile describing attributes of the session. In some embodiments, as a pre-condition for maintaining the session, before the profile of the session is stored, it should be ensured that the replication session is in the suspension state. In some embodiments, the memory of the network storage device 101 may comprise the profile of the session associated with the virtual server 123. Before the virtual server 123 is migrated, the profile describing attributes of the session may be stored in a magnetic disk database (not shown) of the network storage device 101. In some embodiments, the profile may comprise, but not limited to, the following modules of replication operation of the session: a replication scheduling module specifying when to implement replication operation of the session (replication time), a specific program module associated with the replication operation (replication method), and version information or snapshot of the replication object (replication object) and so on. In other words, before the virtual server 123 is migrated and the session is disconnected, the latest state information of the session should be stored for back up when the session is restored.

At 204, the first virtual server 123 associated with session and managed by the first storage processor 111 in the network storage device 101 is migrated to be managed by the second storage processor 112, the migration causing the session to be disconnected. In some embodiments, the network storage device 101 contains two (as shown in FIG. 1A) or more storage processors. Therefore, the virtual server 123 may be migrated from being managed by the first storage processor 111 in the network storage device 101 to being managed by other storage processors. As an example, the virtual server 123 may be migrated to be managed by the storage processor with the minimum load or storage processor designated by the administrator.

At 206, the session is recovered using the attributes based on the stored profile. In some embodiments, after the virtual server 123 is migrated, the session is recovered by reading a profile of attributes for describing the session stored in the magnetic disk database.

At 208, the signature of the session is updated. In some embodiments, the signature of the session may comprise identity information of the session associated with the source side (namely, the replicated side of the two sides of the session), address information associated with the destination side (namely, the replication destination side of the two sides of the session), address information associated with the source side, and address information associated with the destination side. In some embodiments, the signature of the session is updated, namely, the above information is updated based on information of the storage processor (such as a second storage processor 112) for managing the virtual server 123 after the migration operation is completed.

Due to complexity of network storage technology and diversity of user demand, a specific manner for updating signature for different scenarios will be described below in detail.

Figure 3:
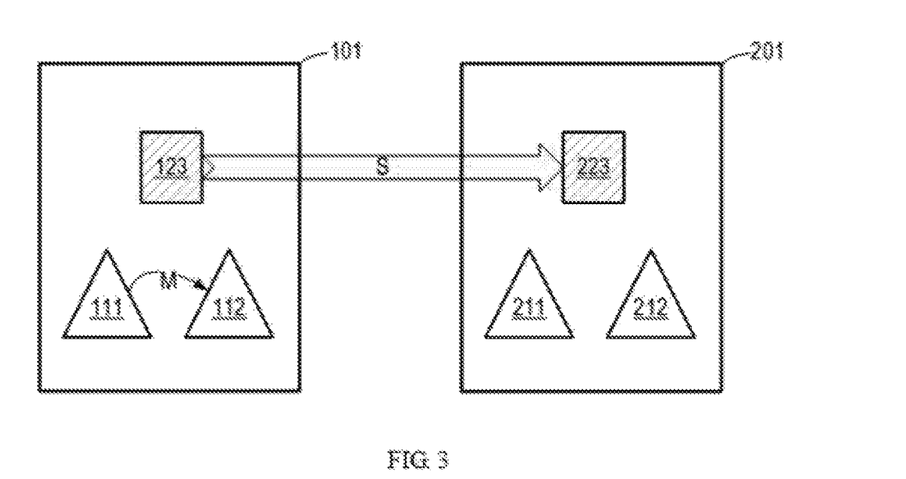
FIG. 3 illustrates a schematic diagram of a first scenario for maintaining a session of a network storage device according to the embodiments of the present disclosure.

FIG. 3 is a schematic diagram illustrating a first scenario for maintaining a session of a network storage device according to the embodiments of the present disclosure. In the first scenario, there is another network storage device 201 which at least comprises a storage processor 211, or more than two storage processors 211 and 212. Besides, as shown in FIG. 3, the network storage device 201 at least comprises a virtual server 223 which may be managed by storage processor 211, 212 or other storage processors in the network storage device 201. The specific configuration of the network storage device 201 may be the same as the network storage device 101 or otherwise.

As shown in FIG. 3, arrow S is used to represent the creation of a session from virtual server 123 to virtual server 223. Generally, as a storage processor has the function of managing virtual servers, the creation of the session is performed based on the storage processor. Therefore, so long as determining which storage processors the source side and the destination side of the session are located, the signature information of the session will be clear so as to maintain the session between virtual servers under the management of each storage processor.

When the migration occurs and before the session is disconnected, according to the manner specified in the above profile or other predefined polices, data in the virtual server 123 of the network storage device 101 are replicated into the virtual server 223 of the network storage device 201, thereby implementing remote replication operation. As the migration causes changes to the storage processor managing the virtual server 123, it is necessary to update the signature of the session based on the information of the storage processor (such as second storage processor 112) for managing the virtual server 123 after the migrating operation is completed. Therefore, updating signature of the session may comprise: in response to detecting that the migration occurs at the source side of the session (namely, the replicated side of two sides of the session, that is, the side of network storage device 101), updating identity information (Source Interconnect ID) associated with the source side in the session as identity information of the second storage processor 112; and updating address information (Source IP) associated with the source side (namely, the side of first storage processor 111 of the network storage device 101) in the session as address of the second storage processor 112. As an example, identity information associated with source side in the session may be updated from "10001" to "20001", and address information associated with source side in the session may be updated from "128.221.255.12" (representing the first storage processor 111) to "128.221.255.13" (representing the second storage processor 112). As the destination side (namely, the replication destination side of the two sides of the session, i.e. the side of network storage device 201) does not involve a migrating operation, it is not necessary to update the corresponding information in the signature.

Besides, as shown in FIG. 3, arrow M represents the migrating operation of the virtual server 123, namely, the migration of the virtual server 123 from being managed by the first storage processor 111 in the network storage device 101 to being managed by the second storage processor 112. In some embodiments, the direction of arrow M may be reversed, namely, the virtual server 123 may be migrated from being managed by the second storage processor 112 to being managed by the first storage processor 111. Accordingly, the operation of updating signature should be adjusted as: updating identity information associated with the source side in the session as identity information of the first storage processor 111; and updating address information associated with the source side in the session as address of the first storage processor 111. As an example, identity information associated with the source side in the session may be updated from "200019" to "10001," and address information associated with source side in the session may be updated from "128.221.255.13" (representing the second storage processor 112) to "128.221.255.12" (representing the first storage processor 111).

A first scenario for migration occurring at the source side of the remote replication session is described above with reference to FIG. 3. In addition, there is a second scenario for migration occurring at the destination side of the remote replication session.

Figure 4:
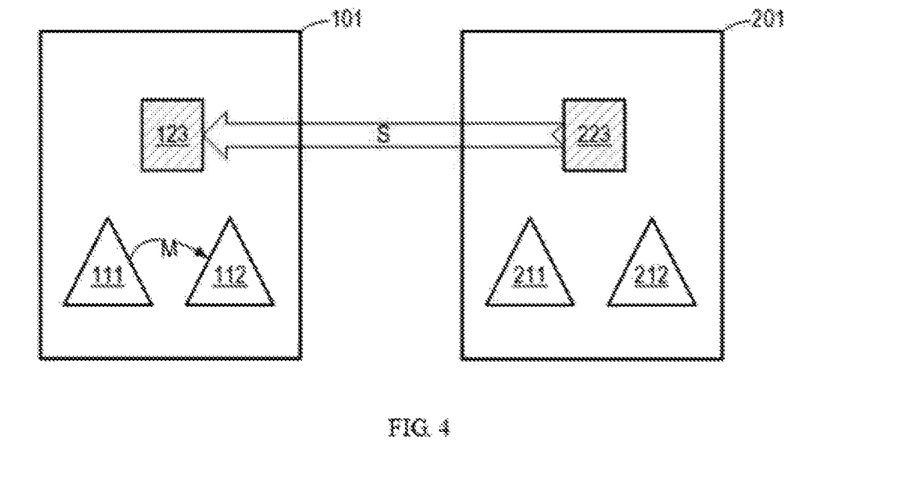
FIG. 4 illustrates a schematic diagram of a second scenario for maintaining a session of a network storage device according to the embodiments of the present disclosure.

FIG. 4 is a schematic diagram illustrating a second scenario for maintaining a session of a network storage device according to the embodiments of the present disclosure. In the second scenario, there is also another network storage device 201 which may be configured in the same manner as the network storage device 201 shown in FIG. 3, which will not be repeated here.

As illustrated in FIG. 4, arrow S is used to represent the creation of a session from the virtual server 223 to virtual server 123. When the migration occurs and before the session is disconnected, according to the manner specified in the above profile or other predefined polices, data in the virtual server 223 of the network storage device 201 are replicated into the virtual server 123 of the network storage device 101, thereby implementing remote replication operation. In other words, the replication relation between network storage device 101 and network storage device 201 is inversed to that shown in FIG. 1, depicting the condition that the migration occurs at the destination side. As the migration causes changes to the storage processor managing virtual server 123, it is necessary to update the signature of the session based on the information of the storage processor (such as second storage processor 112) for managing virtual server 123 after the migrating operation is completed. Therefore, updating signature of the session may comprise: in response to detecting that the migration occurs at the destination side of the session (namely, the replication destination side of the two sides of the session, that is, the side of network storage device 101), updating identity information associated with the destination side in the session as identity information of the second storage processor 112; and updating address information associated with the destination side (namely, the side of the first storage processor 111 of the network storage device 101) in the session as address of the second storage processor 112. As an example, identity information, in the session, associated with the destination side may be updated from "10001" to "20001," and address information associated with destination side in the session may be updated from "128.221.255.12" (representing first storage processor 111) to "128.221.255.13" (representing second storage processor 112). As the source side (namely, the replicated side of the two sides of the session, i.e. the side of network storage device 201) does not involve a migrating operation, it is not necessary to update corresponding information in the signature.

Besides, similar to FIG. 3, arrow M in FIG. 4 also represents the migrating operation of virtual server 123, namely, the migration of the virtual server 123 from being managed by the first storage processor 111 in the network storage device 101 to being managed by the second storage processor 112. In some embodiments, the direction of arrow M may be reversed. For updating of the signature, reference can be made to the corresponding depiction of FIG. 3, thus the description will not be repeated here.

Both the above two scenarios involve replicating session between two network storage devices 101 and 201, which belongs to the remote replicating session operation. Reference will be made to FIGS. 5A, 5B, 6A and 6B below to describe the local replicating session operation in detail.

Figure 5A:
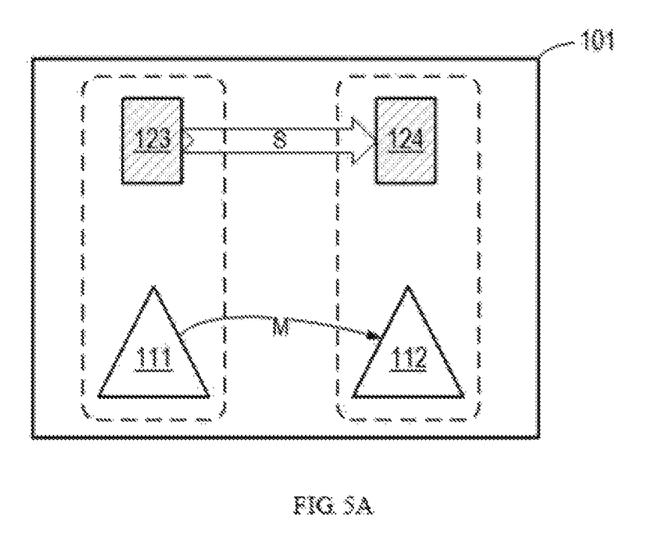
FIG. 5A illustrates a schematic diagram of a third scenario for maintaining a session of a network storage device according to the embodiments of the present disclosure.

FIG. 5A is a schematic diagram illustrating a third scenario for maintaining a session of a network storage device according to the embodiments of the present disclosure. In FIG. 1A, there is only one network storage device 101. Similar to FIG. 1A, the network storage device 101 shown in FIG. 5A may comprise a first virtual server 123, a second virtual server 124, a first storage processor 111 and a second storage processor 112. As shown by the dashed blocks, the first storage processor 111 is configured to manage the first virtual server 123, and the second storage processor 112 is configured to manage the second virtual server 124.

As shown in FIG. 5A, arrow S is used to represent the creation of a session from the first virtual server 123 to the second virtual server 124. When the migration occurs and before the session is disconnected, according to the manner specified in the above profile or other predefined polices, data in the first virtual server 123 of the network storage device 101 managed by the first storage processor 111 are replicated into the second virtual server 124 managed by the second storage processor 112, thereby implementing local replication operation. Apart from the generally utilized manner of remote replication operation, the user may also employ this local replication operation to back up data into a virtual server (such as 124) of the same network storage device 101 managed by another storage processor (such as 112). Therefore, it is necessary to describe a specific manner of updating signature for this scenario in detail. As shown in FIG. 5A, arrow M represents a migrating operation of the virtual server 123, namely, the virtual server 123 is migrated from being managed by the first storage processor 111 to being managed by the second storage processor 112.

Figure 5B:
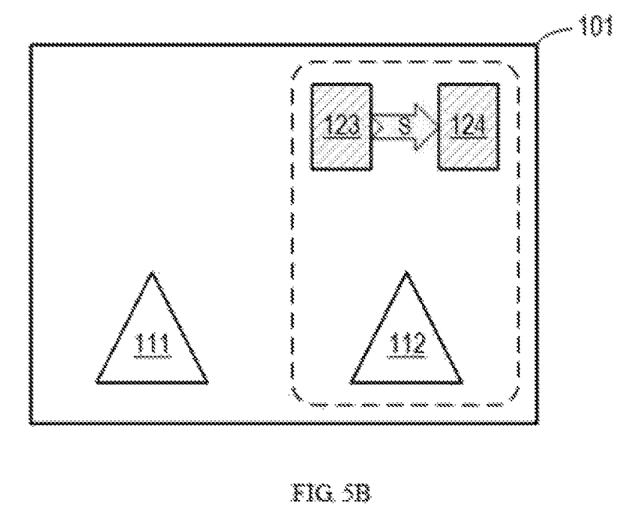
FIG. 5B illustrates a schematic diagram of a third scenario for maintaining a session of a network storage device according to the embodiments of the present disclosure.

FIG. 5B further illustrates a schematic diagram of a third scenario for maintaining a session of a network storage device according to the embodiments of the present disclosure. As shown in FIG. 5B, after the migration occurs, the virtual server 123 is managed by the second storage processor 112. Arrow S is used to represent creation of a session from the first virtual server 123 to the second virtual server 124, and data in the first virtual server 123 of the network storage device 101 managed by the second storage processor 111 are replicated into the second virtual server 124 managed by the second storage processor 111. This kind of replication operation is called "Loopback" operation.

As migration causes changes to the storage processor managing virtual server 123, it is necessary to update signature of the session based on information of the storage processor (such as second storage processor 112) for managing virtual server 123 after the migrating operation is completed. Therefore, updating the signature of the session may comprise: in response to detecting that both the first virtual server 123 and the second virtual server 124 are managed by the second storage processor 112, updating identity information associated with source side (namely, the replicated side of two sides of the session, that is, the side of first storage processor 111) in the session as identity information of the second storage processor 112; and updating address information associated with the source side in the session as address of the second storage processor 112. As an example, as shown in FIG. 5B, if the Loopback operation after migration is performed under the second storage processor 112, according to identity information and address information of the second storage processor, it is possible to update identity information associated with the source side in the session (or together with the identity information associated with the destination side) as "20001," and update address information associated with source side in the session (or together with address information associated with the destination side) as "128. 221. 255. 13." However, if the Loopback operation after migration is performed under the first storage processor 111, they are updated as "10001" and "128. 221. 255. 12," respectively.

Figure 6A:
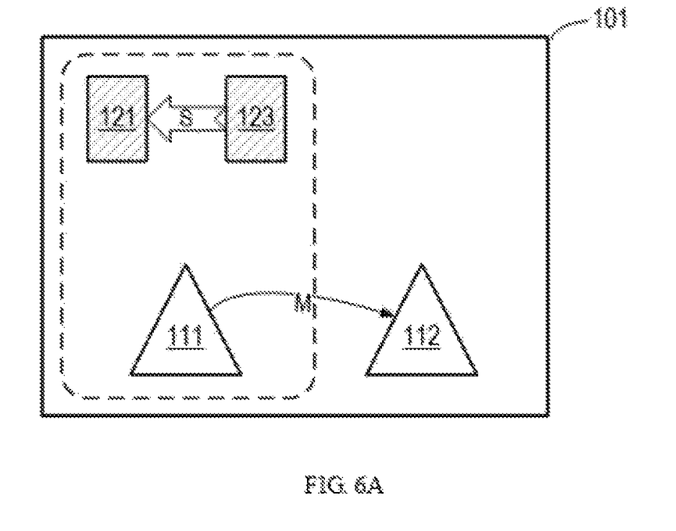
FIG. 6A illustrates a schematic diagram of a fourth scenario for maintaining a session of a network storage device according to the embodiments of the present disclosure.

FIG. 6A is a schematic diagram illustrating a fourth scenario for maintaining a session of a network storage device according to the embodiments of the present disclosure. In FIG. 1A, there is only one network storage device 101. Similar to FIG. 1A, the network storage device 101 in FIG. 6A may comprise a first virtual server 123, a second virtual server 121, a first storage processor 111 and a second storage processor 112. As shown by the dashed boxes, the first storage processor 111 is configured to manage virtual server 123 and virtual server 124.

As shown in FIG. 6A, arrow S is used to represent the creation of a session from the first virtual server 123 to the second virtual server 121, and data in the first virtual server 123 of the network storage device 101 managed by the first storage processor 111 are replicated into the second virtual server 121 managed by the first storage processor 111, thereby implementing the above Loopback operation. Owing to diversity of user demand, there may be a possibility of Loopback operation, namely, data may be backed up in a virtual server (such as 121) of the same network storage device 101 and managed by the same storage processor (such as 111). Thus, it is necessary to describe the specific manner of updating the signature for this scenario. As illustrated in FIG. 6A, arrow M represents a migrating operation of the virtual server 123, namely, virtual server 123 is migrated from being managed by the first storage processor 111 to being managed by the second storage processor 112.

Figure 6B:
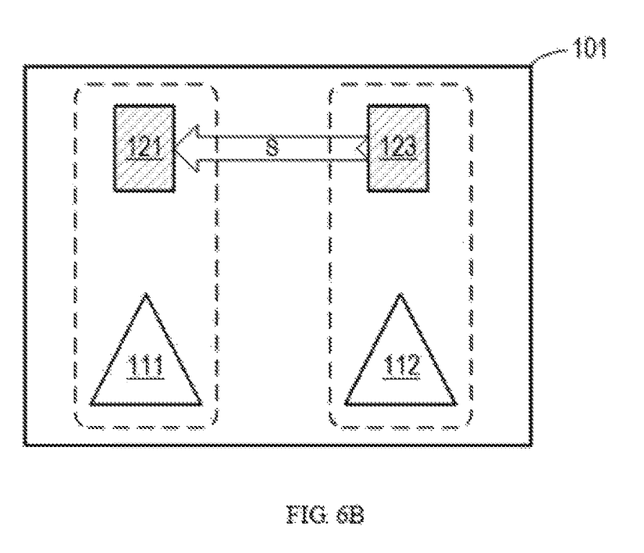
FIG. 6B illustrates a schematic diagram of a fourth scenario for maintaining a session of a network storage device according to the embodiments of the present disclosure.

FIG. 6B further illustrates a schematic diagram of a fourth scenario for maintaining a session of a network storage device after migration occurs according to the embodiments of the present disclosure. As shown in FIG. 6B, after the migration occurs, the first virtual server 123 is managed by the second storage processor 112. Arrow S is used to represent creation of a session from the first virtual server 123 to the second virtual server 121. Data in the first virtual server 123 managed by the second storage processor 112 in the network storage device 101 are replicated into the second virtual server 121 managed by the first storage processor 111, thereby converting from a Loopback operation into a local replication operation.

As migration causes changes to the storage processor managing the virtual server 123, it is necessary to update the signature of the session based on information of the storage processor (such as the second storage processor 112) for managing virtual server 123 after the migrating operation is completed. Therefore, updating the signature of the session may comprise: in response to detecting that the first virtual processor 123 is managed by the second storage processor 112 and the second virtual server 121 is managed by the first storage processor 111, updating identity information associated with the source side (namely, the replicated side of two sides in the session, that is, the side of first virtual server 123) in the session as identity information of the second storage processor 112; and updating address information associated with the source side in the session as address of the second storage processor 112. As an example, as illustrated in FIG. 6B, according to identity information and address information of the second storage processor, it is possible to update identity information associated with the source side in the session as "20003," and update address information associated with the source side in the session as "128. 221. 255. 13." Since the migration does not occur in the virtual server 121 as the destination side, the associated information does not change, or re-assigned with values "10003" and "128. 221. 255. 12."

The data given above in the examples, "10001," "10003," "20001," "20003," "128. 221. 255. 12," and "128. 221. 255. 13" are all illustrative and can be substituted by other available data in the art in case that the implementation is not affected.

In addition, when session is restored, the right identity information can be found by looking up the storage processor that the source side virtual server and destination side virtual server belong to, thereby scheduling a restoration scheme to restore the session.

Figure 7:
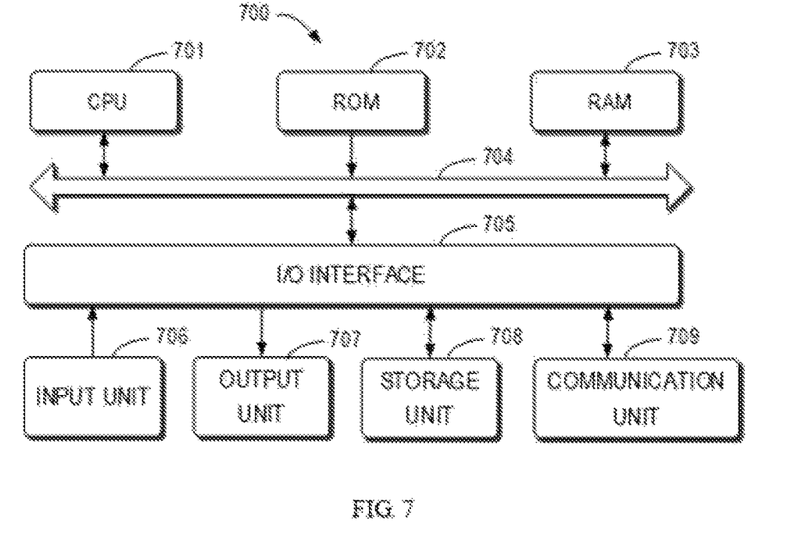
FIG. 7 illustrates a schematic diagram of a device for maintaining a session of a network storage device according to the embodiments of the present disclosure.

FIG. 7 is a schematic diagram adapted to implement an electronic device 700 according to the embodiments of the present disclosure. As shown in the FIG. 7, device 700 comprises a central processing unit (CPU) 710 which may perform various appropriate actions and processing based on computer program instructions stored in a read-only memory (ROM) 720 or the computer program instructions loaded from a storage unit 780 to a random access memory (RAM) 730. The RAM 730 also stores all kinds of programs and data required by operating the storage device 700. CPU 710, ROM 720 and RAM 730 are connected to each other via a bus 740, to which an input/output (I/O) interface 750 is also connected.

A plurality of components in the device 700 are connected to the I/O interface 705, including: an input unit 706, such as keyboard, mouse and the like; an output unit 707, such as various types of displays, loudspeakers and the like; a storage unit 708, such as magnetic disk, optical disk and the like; and a communication unit 709, such as network card, modem, wireless communication transceiver and the like. The communication unit 709 allows the device 700 to exchange information/data with other devices through computer networks such as Internet and/or various telecommunication networks.

Each procedure and processing described above, such as process 200, can be executed by a processing unit 710. As an example, in some embodiments, method 200 can be implemented as computer software programs, which are tangibly included in a machine-readable medium, such as storage unit 708. In some embodiments, the computer program can be partially or completely loaded and/or installed to the device 700 via ROM 702 and/or the communication unit 709. When the computer program is loaded to RAM 703 and executed by CPU 701, one or more steps of the above described method 200 are implemented. Alternatively, in other embodiments, CPU 701 can also be configured to execute the above described process in any suitable manner.

Figure 8:
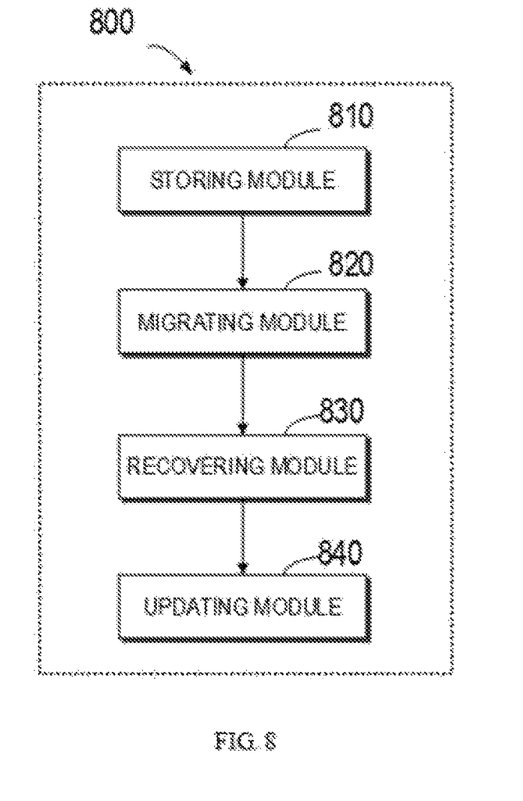
FIG. 8 illustrates a schematic block diagram of an device for implementing embodiments of the present disclosure.

FIG. 8 schematically illustrates a block diagram of an apparatus for data protection according to the embodiments of the present disclosure. As shown in the figure, apparatus 800 comprises a storing module 810, a migrating module 820, a recovering module 830, and an updating module 840.

The storing module 810 is configured to store the profile of the session in a network storage device, the profile describing attributes of the session.

The migrating module 820 is configured to migrate a first virtual server associated with the session and managed by the first storage processor in the network storage device to be managed by the second storage processor, the migration causing the session to be disconnected.

The restoration module 830 is configured to recover the session using the attributes based on the stored profile.

The updating module 840 is configured to update the signature of the session. In some embodiments, as an example, data in the network storage device are replicated via the session into another network storage device before the session is disconnected, and updating the signature of the session may comprise: updating identity information associated with the network storage device in the session as identity information of the second storage processor; and updating address information associated with the first storage processor as address of the second storage processor.

In some embodiments, as an example, data in another network storage device are replicated into the network storage device via the session before the session is disconnected, and updating the signature of the session may comprise: updating identity information associated with the network storage device in the session be to identity information of the second storage processor; and updating address information associated with the first storage processor in the session to be address of the second storage processor.

In some embodiments, as an example, data in the first virtual server managed by the first storage processor are replicated into the second virtual server managed by the second storage processor via the session before the session is disconnected, and updating the signature of the session may comprise: updating identity information associated with the first storage processor in the session to be identity information of the second storage processor; and updating address information associated with the first storage processor in the session to be address of the second storage processor.

In some embodiments, as an example, data in the first virtual server managed by the first storage processor are replicated into the second virtual server managed by the first storage processor via the session before the session is disconnected, and updating the signature of the session may comprise: updating identity information associated with the first virtual server in the session to be identity information of the second storage processor; and updating address information associated with the first virtual server in the session to be address of the second storage processor.

The units contained in the apparatus 800 can be implemented in various ways, including software, hardware, firmware, or any combination thereof. In some embodiments, one or more units may be implemented in software and/or firmware, for instance, machine-executable instructions stored on a storage medium. In addition to or instead of the machine-executable instructions, a part of or all the units in the apparatus 800 may be implemented at least in part by one or more hardware logic components. As an example, and without limitations, illustrative types of hardware logic components that can be used include a field programmable gate array (FPGA), an application specific integrated circuit (ASIC), application specific standard parts (ASSP), a system on chip (SOC), and a complex programmable logic device (CPLD), and the like.

These units shown in FIG. 8 can be partially or wholly implemented as a hardware module, a software module, a firmware module or any combination thereof. Specifically, in some embodiments, the procedure, method or process described in the preceding context can be implemented by hardware in the network device. As an example, the storing module, the migrating module, the recovering module and updating module may be used to implement method 200 shown in FIG. 2.

Generally, the various exemplary embodiments of the present disclosure may be implemented in hardware or application-specific circuit, software, logic, or in any combination thereof. Some aspects may be implemented in hardware, while the other aspects may be implemented in firmware or software executed by a controller, a microprocessor or other computing devices. When various aspects of the embodiments of the present disclosure are illustrated or described into block diagrams, flow charts, or other graphical representations, it would be understood that the block diagrams, apparatus, system, technique or method described here may be implemented, as non-restrictive examples, in hardware, software, firmware, dedicated circuit or logic, common software or controller or other computing devices, or some combinations thereof.

As an example, the embodiments of the present disclosure can be described in a context of machine-executable instructions which are included, for instance, in the program module executed in the device on a target real or virtual processor. Generally, a program module includes routine, program, bank, object, class, component and data structure, etc. and performs a particular task or implements a particular abstract data structure. In the embodiments, the functions of the program modules can be combined or divided among the described program modules. The machine executable instructions for the program module can be executed locally or in a distributed device. In the distributed device, the program module can be located between the local and remote storage mediums.

The computer program code for implementing the method of the present disclosure can be complied with one or more programming languages. These computer program codes may be provided to a general-purpose computer, a dedicated computer or a processor of other programmable data processing apparatuses, such that when the program codes are executed by the computer or other programmable data processing apparatuses, the functions/operations prescribed in the flow chart and/or block diagram are caused to be implemented. The program code may be executed completely on a computer, partially on a computer, partially on a computer as an independent software packet and partially on a remote computer, or completely on a remote computer or server.

In the context of the present disclosure, the machine-readable medium may be any tangible medium including or storing a program for or about an instruction executing system, apparatus or device. The machine-readable medium may be a machine-readable signal medium or machine-readable storage medium. The machine-readable medium may include, but not limited to, electronic, magnetic, optical, electro-magnetic, infrared, or semiconductor system, apparatus or device, or any appropriate combination thereof. More detailed examples of the machine-readable storage medium include, an electrical connection having one or more wires, a portable computer magnetic disk, hard drive, random-access memory (RAM), read-only memory (ROM), erasable programmable read-only memory (EPROM or flash memory), optical storage device, magnetic storage device, or any appropriate combination thereof.

Besides, although the operations are depicted in a particular sequence, it should not be understood that such operations are completed in a particular sequence as shown or in a successive sequence, or all shown operations are executed so as to achieve a desired result. In some cases, multi-task or parallel-processing would be advantageous. Likewise, although the above discussion includes some specific implementation details, they should not be explained as limiting the scope of any invention or claims, but should be explained as a description for a particular embodiment of a particular invention. In the present invention, some features described in the context of separate embodiments may also be integrated into a single embodiment. On the contrary, various features described in the context of a single embodiment may also be separately implemented in a plurality of embodiments or in any suitable sub-group.

Compared with the prior art, embodiments of the present disclosure have various advantages. For instance, embodiments of the present disclosure enable the signature of the session to be updated automatically after migration occurs. Embodiments of the present disclosure may also update the signature of the session automatically for different scenarios and user's demand, and finally enable the replication session in the network storage device to be maintained.

Through the above depiction and the teaching given by the drawings, many modifications and other embodiments of the present disclosure can be realized by those skilled in the art related to the present disclosure. Therefore, it is to be understood that the implementations of the present disclosure are not limited to the specific implementations disclosed herein, and the modifications and other implementations are intended to be included in the scope of the present disclosure. Furthermore, though the above depiction and associated drawings describe the example implementations under the context of some example combinations of components and/or functions, it should be realized that alternative implementations can provide different combinations of components and/or functions without departing from the scope of the present disclosure. In this respect, as an example, other forms of combinations of components and/or functions different from those described explicitly above are also expected to be included in the scope of the present disclosure. Although specific terms are employed here, they are used in a general and descriptive sense rather than for limiting purpose.

We claim:

1. A method of maintaining a session for a network storage device, comprising:
storing a profile of the session into the network storage device, the profile describing attributes of the session;
migrating a first virtual server associated with the session and managed by a first storage processor in the network storage device to be managed by a second storage processor in the network storage device, the migration causing the session to be disconnected, wherein the session comprises a replication session from the first virtual server to a second virtual server that is managed by the second storage processor for backing up data between the first virtual server and the second virtual server;
recovering the replication session as a Loopback operation using the attributes based on the stored profile, wherein the Loopback operation is a Loopback operation performed under the second storage processor after the first virtual server is migrated to be managed by the second storage processor; and
updating a signature of the replication session, wherein the signature of the replication session indicates a source side of the replication session and a destination side of the replication session, and wherein updating the signature of the replication session includes, in response to detecting that both the first virtual server and the second virtual server are managed by the second storage processor, updating identity information of the source side of the replication session as identity information of the second storage processor.

2. The method according to claim 1, wherein data in the network storage device are replicated into further network storage device via the session before the session is disconnected, and wherein updating the signature of the session comprises:
updating identity information associated with the network storage device in the session to be identity information of the second storage processor; and
updating address information associated with the first storage processor in the session to be address of the second storage processor.

3. The method according to claim 1, wherein data in further network storage device are replicated into the network storage device via the session before the session is disconnected, and wherein updating the signature of the session comprises:
updating identity information associated with the network storage device in the session to be identity information of the second storage processor; and
updating address information associated with the first storage processor in the session to be address of the second storage processor.

4. The method according to claim 1, wherein data in the first virtual server managed by the first storage processor are replicated into the second virtual server managed by the second storage processor via the session before the session is disconnected, and wherein updating the signature of the session comprises:
updating address information associated with the first storage processor in the session to be address of the second storage processor.

5. The method according to claim 1, wherein data in the first virtual server managed by the first storage processor are replicated into the second virtual server managed by the second storage processor via the session before the session is disconnected, and wherein updating the signature of the session comprises:
updating identity information associated with the first virtual server in the session to be identity information of the second storage processor; and
updating address information associated with the first virtual server in the session to be address of the second storage processor.

6. The method according to claim 1, wherein the replication session backs up data between the first virtual server and the second virtual server.

7. The method according to claim 6, wherein the first virtual server is a source side of the replication session between the first virtual server and the second virtual server.

8. An electronic device, comprising:
at least one processing unit; and
at least one memory coupled to the at least one processing unit and storing machine executable instructions, the instructions, when executed by the at least one processing unit, causing the electronic device to perform acts comprising:
storing a profile of a session for a network storage device into the network storage device, the profile describing attributes of the session;
migrating a first virtual server associated with the session and managed by the first storage processor in the network storage device to be managed by a second storage processor in the network storage device, the migration causing the session to be disconnected, wherein the session comprises a replication session from the first virtual server to a second virtual server that is managed by the second storage processor for backing up data between the first virtual server and the second virtual server;
recovering the replication session as a Loopback operation using the attributes based on the stored profile, wherein the Loopback operation is a Loopback operation performed under the second storage processor after the first virtual server is migrated to be managed by the second storage processor; and
updating a signature of the replication session, wherein the signature of the replication session indicates a source side of the replication session and a destination side of the replication session, and wherein updating the signature of the replication session includes, in response to detecting that both the first virtual server and the second virtual server are managed by the second storage processor, updating identity information of the source side of the replication session as identity information of the second storage processor.

9. The device according to claim 8, wherein data in the network storage device are replicated into further network storage device via the session before the session is disconnected, and wherein updating the signature of the session comprises:
updating identity information associated with the network storage device in the session to be identity information of the second storage processor; and
updating address information associated with the first storage processor in the session to be address of the second storage processor.

10. The device according to claim 8, wherein data in further network storage device are replicated into the network storage device via the session before the session is disconnected, and wherein updating the signature of the session comprises:
updating identity information associated with the network storage device in the session to be identity information of the second storage processor; and
updating identity information associated with the first storage processor in the session to be address of the second storage processor.

11. The device according to claim 8, wherein data in the first virtual server managed by the first storage processor are replicated into the second virtual server managed by the second storage processor via the session before the session is disconnected, and wherein updating the signature of the session comprises:
updating address information associated with the first storage processor in the session to be address of the first virtual server managed by the second storage processor after the migration.

12. The device according to claim 8, wherein data in the first virtual server managed by the first storage processor are replicated into the second virtual server managed by the second storage processor via the session before the session is disconnected, and wherein updating the signature of the session comprises:
updating identity information associated with the first virtual server in the session to be identity information of the second storage processor; and
updating address information associated with the first virtual server in the session to be migrated address of the first virtual server managed by the second storage processor after the migration.

13. A computer program product tangibly stored on a non-transient computer readable medium and including machine executable instructions which, when executed, cause a machine to:
store a profile of a session for a network storage device into the network storage device, the profile describing attributes of the session;
migrate a first virtual server associated with the session and managed by the first storage processor in the network storage device to be managed by a second storage processor in the network storage device, the migration causing the session to be disconnected, wherein the session comprises a replication session from the first virtual server to a second virtual server that is managed by the second storage processor for backing up data between the first virtual server and the second virtual server that;
recover the replication session as a Loopback operation using the attributes based on the stored profile, wherein the Loopback operation is a Loopback operation performed under the second storage processor after the first virtual server is migrated to be managed by the second storage processor; and
update a signature of the replication session, wherein the signature of the replication session indicates a source side of the replication session and a destination side of the replication session, and wherein the signature of the replication session is updated, in response to detecting that both the first virtual server and the second virtual server are managed by the second storage processor, at least in part by updating identity information of the source side of the replication session as identity information of the second storage processor.

14. The computer program product according to claim 13, wherein data in the network storage device are replicated into further network storage device via the session before the session is disconnected, and wherein updating the signature of the session comprises:
updating identity information associated with the network storage device in the session to be identity information of the second storage processor; and
updating identity information associated with the first storage processor in the session to be address of the second storage processor.

15. The computer program product according to claim 13, wherein data in further network storage device are replicated into the network storage device via the session before the session is disconnected, and wherein updating the signature of the session comprises:
updating identity information associated with the network storage device in the session to be identity information of the second storage processor; and
updating identity information associated with the first storage processor in the session to be address of the second storage processor.

16. The computer program product according to claim 13, wherein data in the first virtual server managed by the first storage processor are replicated into the second virtual server managed by the second storage processor via the session before the session is disconnected, and wherein updating the signature of the session comprises:
updating address information associated with the first storage processor in the session to be address of the first virtual server managed by the second storage processor after the migration.

17. The computer program product according to claim 13, wherein data in the first virtual server managed by the first storage processor are replicated into the second virtual server managed by the second storage processor via the session before the session is disconnected, and wherein updating the signature of the session comprises:
updating identity information associated with the first virtual server in the session to be identity information of the second storage processor; and
updating address information associated with the first virtual server in the session to be address of the first virtual server managed by the second storage processor after the migration.

* * * * *